United States Patent [19]

Factor et al.

[11] 4,093,589

[45] June 6, 1978

[54] NON-OPAQUE FLAME RETARDANT POLYCARBONATE COMPOSITION

[75] Inventors: Arnold Factor, Scotia, N.Y.; Donald Benjamin George Jaquiss, New Harmony; Victor Mark, Evansville, both of Ind.

[73] Assignee: General Electric Company, Pittsfield, Mass.

[21] Appl. No.: 765,363

[22] Filed: Feb. 3, 1977

[51] Int. Cl.² .............................................. C08K 5/42
[52] U.S. Cl. ........................ 260/45.75 B; 260/45.7 S; 260/45.7 PS; 260/45.8 N; 260/45.9 QB
[58] Field of Search ............... 260/45.7 S, 45.9 QB, 260/45.75 B, 45.7 PS, 45.8 N

[56] References Cited

U.S. PATENT DOCUMENTS

| | | | |
|---|---|---|---|
| 3,775,367 | 11/1973 | Mark | 260/45.7 |
| 3,909,490 | 9/1975 | Mark | 260/45.7 |
| 3,917,559 | 11/1975 | Mark | 260/45.7 |
| 3,919,167 | 11/1975 | Mark | 260/45.7 |
| 3,926,908 | 12/1975 | Mark | 260/45.7 |
| 3,931,100 | 1/1976 | Mark | 260/45.7 |
| 3,933,734 | 1/1976 | Mark et al. | 260/45.7 |
| 3,940,366 | 2/1976 | Mark | 260/45.7 |
| 3,948,851 | 4/1976 | Mark | 260/45.7 |
| 3,951,910 | 4/1976 | Mark | 260/45.7 |
| 3,953,396 | 4/1976 | Mark | 260/45.7 |
| 3,978,024 | 8/1976 | Mark | 260/45.7 |

*Primary Examiner*—V. P. Hoke
*Attorney, Agent, or Firm*—William F. Mufatti

[57] ABSTRACT

A non-opaque flame retardant polycarbonate composition comprising in admixture an aromatic carbonate polymer and an additive which may be the organic cationic salts of either monomeric or polymeric unsubstituted or substituted aliphatic, aromatic or heterocyclic sulfonic acids and inorganic acids.

9 Claims, No Drawings

NON-OPAQUE FLAME RETARDANT POLYCARBONATE COMPOSITION

This invention is directed to a non-opaque flame retardant polycarbonate composition and, in particular, an aromatic polycarbonate containing in admixture therewith an additive which may be the organic cationic salts of either monomeric or polymeric unsubstituted or substituted aliphatic, aromatic or heterocyclic acids and inorganic acids. Also, this additive may be a mixture of an organic cationic salt of either monomeric or polymeric unsubstituted or substituted aliphatic, aromatic or heterocylic acids, inorganic acids and an alkali or alkaline earth metal salt of a monomeric or polymeric unsubstituted or substituted aliphatic, aromatic, or heterocyclic sulfonic acid.

BACKGROUND OF THE INVENTION

With the increasing concern for safety, there is a positive move toward providing safe materials for public and household use. One particular area of need is that of providing flame resistant or flame retardant non-opaque products for use by the ultimate consumer. As a result of this demand, many products are being required to meet certain flame retardant criteria both by local and federal government and the manufacturers of such products. One particular set of conditions employed as a measuring standard for flame retardancy is set forth in Underwriters' Laboratories, Inc. Bulletin 94. This Bulletin sets forth certain conditions by which materials are rated for flame retardant characteristics.

In the art, there are many known flame retardant additives which are employed by mixing with products to render such materials flame retardant. Such flame retardant additives have been known to be employed in amounts of 5 to 20 weight percent in order to be effective in avoiding burning of those products which are combustible. It has also been found, however, that such amounts can have a degrading effect upon the base product to be rendered flame retardant, resulting in the losses of valuable physical properties of the base product. This is particularly so when employing known flame retardant additives with the base product polycarbonate resins. Many of these known additives have a degrading effect upon the polymer.

In many instances, it is desirable that articles produced from these fire retardant polycarbonate resins retain their non-opaque characteristics.

DESCRIPTION OF THE INVENTION

It has now been suprisingly discovered that an aromatic polycarbonate can be made flame retardant while retaining its non-opaque characteristics by incorporating with the aromatic polycarbonate 0.001 to about 10.0 parts per hundred parts of aromatic polycarbonate of certan additives, which additives are inert, do not degrade the aromatic polycarbonate and also retain the non-opaque characteristics of the polycarbonate composition.

These additives are selected from the group consisting of the organic cationic salts of unsubstituted ans substituted monomeric or polymeric aliphatic, aromatic or heterocyclic sulfonic acids and mixtures thereof and inorganic acids. Also, these additives include mixtures of the above additives with the alkali or alkaline earth metal salts of unsubstituted or substituted monomeric or polymeric aliphatic, aromatic or heterocyclic sulfonic acids.

The cationic portion of the organic cationic salt of unsubstituted and substituted monomeric or polymeric aliphatic, aromatic or heterocyclic sulfonic acids and inorganic acids is selected from the following group of cations:

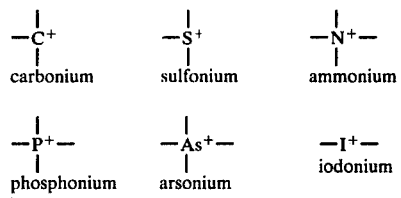

where the open valences can be attached independently to hydrogen or substituents via the following elements: C, O, N, S, P. These organic cationic moieties may be present either singly or multiply or as members of open or cyclic structures and attached to the elements by single or double bonds.

When the substituent on the cationic species is C, it may be present as $C_1$ to $C_{12}$ alkyl, aryl of 6 to 14 carbon atoms, substituted aryl or heterocyclic substituent attached through this carbon. These substituents may be exemplified as follows:

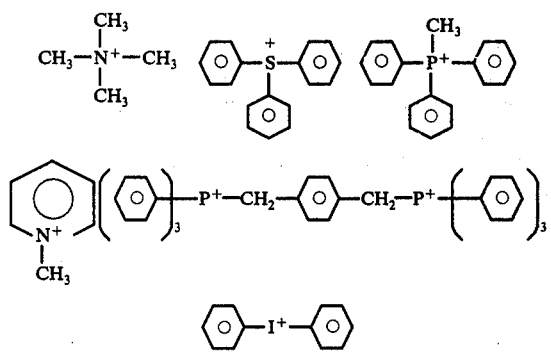

When the substituent on the cationic species is O, it may be present as hydroxy, $C_1$ to $C_{12}$ alkoxy, aryloxy of 6 to 14 carbon atoms, substituted aryloxy, or a heterocyclic substituent attached through this oxygen. These substituents may be exemplified as follows:

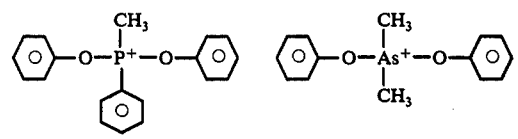

When the substituent on the cationic species is N, it may be present as an amino; alkylamino and dialkylamino of 1 to 12 carbon atoms; arylamino and diarylamino of 6 to 20 carbon atoms; substituted arylamino and diarylamino; or a heterocyclic substituent attached through this nitrogen; or it may be attached to one or two other amino substituents. These substituents may be exemplified by the following compounds:

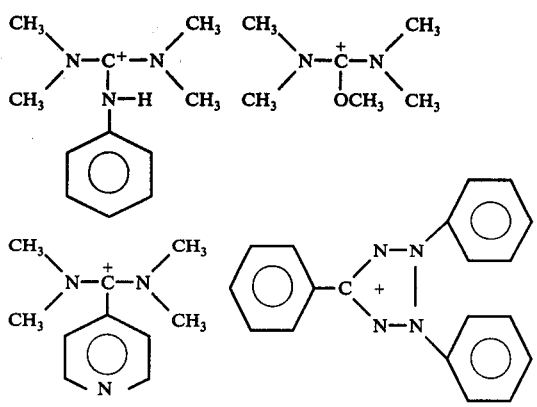

When the substituent on the cationic species is S, it may be present as sulfhydryl; alkylthio of 1 to 12 carbon atoms; arylthio of 6 to 14 arbon atoms; substituted arylthio or a heterocyclic substituent attached through this sulfer. These substituents may be exemplified by the following compounds:

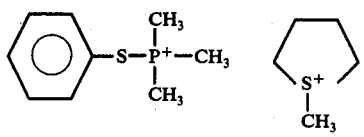

When the substituent on the cationic species is P, it may be present as phosphino, alkylphosphino of 1 to 12 carbon atoms; arylphosphino of 6 to 14 carbon atoms, substituted arylphosphino or a heterocyclic substituent attached through this phosphorus. These substituents may be exemplified by the following compounds:

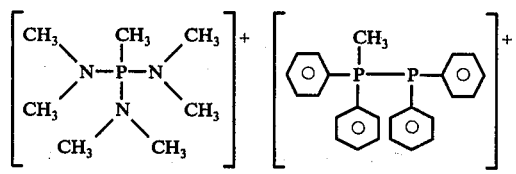

It is to be understood that several of the above substituents, especially the RO— and $R_2N$— substituents, may interact electronically with the cationic center by what is called charge delocalization, which is customarily represented by additional dotted lines, e.g., in the following structures:

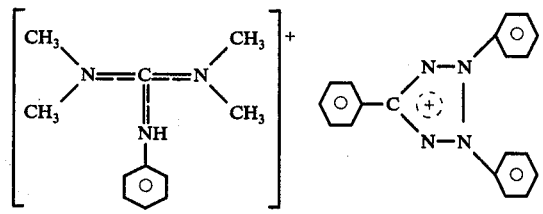

The anionic portion of the organic cationic salt is an inorganic anion comprising chloride, bromide, iodide, sulfate, sulfite, carbonate, nitrate, phosphate and borate as well as unsubstituted and substituted monomeric or polymeric aliphatic, aromatic or heterocyclic sulfonate anions. These sulfonates are selected from:
monomeric or polymric aromatic sulfonates;
monomeric or polymeric substituted aromatic sulfonates;
monomeric or polymeric aromatic sulfonesulfonates;
aromatic ketone sulfonates;
heterocyclic sulfonates;
halogenated methanesulfonates;
perfluoroalkane sulfonates;
aromatic sulfide sulfonates;
monomeric or polymeric aromatic ether sulfonates;
aliphatic and olefinic sulfonates;
monomeric or polymeric phenol ester sulfonates;
halocycloaliphatic aromatic sulfonates;
monomeric or polymeric aromatic amide sulfonates.

These anionic sulfonates are fully described in their alkali metal and alkaline earth metal salt form, in the following patents and applications:

U.S. Pat. No. 3,933,734 (A) issued on Jan. 20, 1976, tilted Flame Retardant Polycarbonate Composition, discloses a flame retardant polycarbonate composition of an aromatic carbonate polymer containing in admixture therewith, an additive which is the metal salt of either the monomeric or polymeric aromatic sulfonic acids or mixtures thereof.

U.S. Pat. No. 3,940,366 (B) issued on Feb. 24, 1976, titled Flame Retardant Polycarbonate Composition, discloses a flame retardant polycarbonate composition of an aromatic carbonate polymer containing in admixture therewith, an additive which is the metal salt of either the monomeric or polymeric substituted aromatic sulfonic acids or mixtures thereof.

U.S. Pat. No. 3,948,851 (C) issued on Apr. 6, 1976, titled Flame Retardant Polycarbonate Composition, discloses a flame retardant polycarbonate composition of an aromatic carbonate polymer contaning in admixture therewith, an additive which is the metal salt of either the monomeric or polymeric aromatic sulfone sulfonic acids or mixtures thereof.

U.S. Pat. No. 3,926,908 (D) issued on Dec. 16, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic ketones and mixtures thereof.

U.S. Pat. No. 3,919,167 (E) issued on Nov. 11, 1975, titled Flame Retardant Polycarbonate Composition, discloses a flame retardant polycarbonate composition of an aromatic carbonate polymer containing in admixture therewith, an additive which is the metal salts of heterocyclic sulfonic acids.

Copending application Ser. No. 429,125, filed Dec. 28, 1973 (F) of Victor Mark, titled Flame Retardant Polycarbonate Composition and assigned to the same assignee as the present invention, discloses a flame retardant polycarbonate composition of an aromatic carbonate polymer containing in admixture therewith, an additive which is the metal salt of halogenated methanesulfonic acids or mixtures thereof. Also, included herein are perfluoroalkane alkalie metal and alkaline earth metal sulfonates, or perfluoroalkane ammonium sulfonates as set forth in U.S. Pat. No. 3,775,367 (G).

U.S. Pat. No. 3,909,490 (H) issued Sept. 30, 1975, titled Flame Retardant Polycarbonate Composition, discloses a flame retardant polycarbonate composition of an aromatic carbonate polymer containing in admixture therewith, an additive which is the metal salt of substituted and unsubstituted sulfonic acids of aromatic sulfides and mixtures thereof.

U.S. Pat. No. 3,953,396 (I) issued Apr. 27, 1976, titled Flame Retardant Polycarbonate Composition, discloses a flame retardant polycarbonate composition of an aromatic carbonate polymer containing in admixture therewith, and additive which is the metal salt of either the substituted or unsubstituted sulfonic acid of an aromatic ether.

U.S. Pat. No. 3,931,100 (J) issued Jan. 6, 1976, titled A Flame Retardant Polycarbonate Composition, discloses a flame retardant polycarbonate composition of an aromatic carbonate polymer containing in admixture therewith a metal salt of aliphatic and olefinic sulfonic acids or mixtures thereof.

U.S. Pat. No. 3,978,024 (K) issued Aug. 31, 1976, titled A Flame Retardant Polycarbonate Composition, discloses a flame retardant polycarbonate composition of an aromatic carbonate polymer containing in admixture therewith, metal salts of either monomeric or polymeric phenol ester sulfonic acids or mixtures thereof.

U.S. Pat. No. 3,917,559 (L) issued Nov. 4, 1975, titled A Flame Retardant Polycarbonate Composition, discloses a flame retardant polycarbonate composition of an aromatic carbonate polymer containing in admixture therewith, meta salts of halocycloaliphatic sulfonic acids.

U.S. Pat. No. 3,951,910 (M) issued Apr. 2, 1976, titled A Flame Retardant Polycarbonate Composition, discloses a flame retardant polycarbonate composition of an aromatic carbonate polymer containing in admixture therewith, a metal salt of either the monomeric or polymeric substituted and unsubstituted aromatic amide halo-, nitro-, trihalomethyl- and or mixtures thereof.

Patents and applications (A) through (M) are incorporated herein by reference.

As stated in the above-identified patents and applications, and as employed herein in the salts substituted by electron withdrawing radicals, the electron withdrawing radicals are the halonitro-, trihalomethyl-and cyano- electron withdrawing radicals or mixtures of these electron withdrawing radicals.

The electron withdrawing phenomenon, or as it is also referred to as electronegativity, is defined in *Basic Principles of Organic Chemistry* by Roberts and Caserio, 1964 (pages 185–186), and *Physical Organic Chemistry* by Jack Hine, McGraw-Hill Book Company, Inc. 1962 (pages 5, 32 and 85–93). Briefly, the electron withdrawing phenomenon is where the radical has a strong affinity for a negative charge, namely, electrons, but still remains covalent and does not form an ion. This is an extremely brief description of this phenomenon and is merely set forth here to describe the electron withdrawing effect. Reference should be made to the texts set forth above.

Additionally, the organic cationic salts of unsubstituted and substituted monomeric or polymeric aliphatic, aromatic or heterocyclic sulfonic acids or inorganic anions may be admixed with any of the alkali metal and alkali earth metal salts described in patents and applications (A) through (M) described supra.

The instant composition is non-opaque. This means that it is able to transmit light and is from translucent to transparent. The reason for the high light transmission of these compositions is due primarily to the better solubility of these organic cationic salts relative to their alkali or alkaline earth metal counterparts.

In the practice of this invention, any of the aromatic polycarbonates can be employed herein. These are homopolymrs and copolymers admixtures thereof that are prepared by reacting a dihydric phenol with carbonate precursor. Typical of some of the dihydric phenols that may be employed in the practice of this invention are bisphenol-A, (2,2-bis(4-hydroxyphenyl)propane), bis-(4-hydroxyphenyl)methane, 2,2-bis(4-hydroxy-3-methylphenyl)propane, 3,3-bis(4-hydroxyphenyl)pentane, 2,2-bis(3,5-dichloro-4-hydroxy-phenyl)propane, 2,2-bis(3,5-dibromo-4-hydroxyphenyl)propane, bis(3-chloro-4 -hydroxyphenyl)methane. Other dihydric phenols of the bisphenol type are also available and are disclosed in U.S. Pat. Nos. 2,999,835, 3,028,365 and 3,334,154.

It is, of course, possible to employ two or more different dihydric phenols or a copolymer of a dihydric phenol with a glycol or with hydroxy or acid terminated polyester, or with a dibasic acid in the event a carbonte copolymer or interpolymer rather than a homopolymer is desired for use in the preparation of the aromatic carbonate polymers of this invention. Also employed in the practice of this invention may be blends of any of the above materials to provide the aromatic carbonate polymer.

The carbonate precursor may be either a carbonyl halide, a carbonate ester or a haloformate. The carbonyl haides which can be employed herein are carbonyl bromide, carbonyl chloride and mixtures thereof. Typical of the carbonate esters which may be employed herein are diphenyl carbonate, di-(halophenyl) carbonates such as di-(chlorophenyl) carbonate, di-(bromophenyl) carbonate, di-(trichlorpheny) carbonate, di-(tribromophenyl) carbonate, etc., di-(alkylphenyl) carbonate such as di(tolyl) carbonate, etc., di-(naphthyl) carbonate, di-(chloronaphthyl) carbonate, phenyl tolyl carbonate, chlorophenyl chloronaphthyl carbonate, etc., or mixtures thereof. The haloformates suitable for use herein include bis-haloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric derivatives of a dihydric phenol, a dicarboxylic acid and carbonic acid. These are disclosed in U.S. Pat. No. 3,169,121 which is incorporated herein by reference.

The aromatic carbonate polymers of this invention may be prepared by employing a molecular weight regulator, an acid acceptor and a catalyst. The molecular weight regulators which can be employed in carrying out the process of this invention include monohydric phenols such as phenol, chroman-I, paratertiary-butylphenol, parabromophenol, primary and secondary amines, etc. Preferably, phenol is employed as the molecular weight regulator.

A suitable acid acceptor may be either an organic or an inorganic acid acceptor. A suitable organic acid acceptor is a tertiary amine and includes such materials as pyridine, triethylamine, dimethylaniline, tributylamine, etc. The inorganic acid acceptor may be one which can be either a hydroxide, a carbonate, a bicarbonate, or a phosphate of an alkali or alkaline earth metal.

The catalysts which are employed herein can be any of the suitable catalysts that aid the polymerization of bisphenol-A with phosgene. Suitable catalysts include teritary amines such as, for example triethylamine, tripropylamine, N,N-dimethylaniline, quaternary ammonium compounds such as, for example, tetraethylammonium bromide, cetyl triethyl ammonium bromide, tetra-n-hyptylammonium iodide, tetra-n-propyl ammonium bromide, tetramethylammonium chloride, tetramethyl ammonium hydroxide, tetra-n-butylammonium iodide, benzyltrimethylammonium chloride and quaternary phosphonium compounds such as, or example, n-butyltriphenyl phosphonium bromide and methyltriphenyl phosphonium bromide.

Also, included herein are branched polycarbonates wherein a polyfunctional aromatic compound is reacted with the dihydric phenol ad carbonate precursor to provide a thermoplastic randomly branched polycarbonate.

These polyfunctional aromatic compounds contain at least three functional groups which are carboxyl, carboxylic anhydride, haloformyl or mixtures thereof. Examples of these polyfunctional aromatic compounds which may be employed in the practice of this invention include: trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride and the like. The preferred polyfunctional aromatic compounds are trimellitic anhydride or trimellitic acid, or their haloformyl derivatives.

Also, included herein are blends of a linear polycarbonate and a branched polycarbonate.

The composition of this invention is prepared by admixing the aromatic carbonate polymer with the organic cationic salts. The organic cationic salts may e admixed with the polycarbonte in a finely divided solid form or they may be admixed in the form of a solution. Preferably, the organic cationic salts are dissolved in a solvent in which they are soluble such as methanol and water, for example. Most preferably, the salts are admixed with the polycarbonate in the form of an aqueous solution.

The compositions of the instant invention may contain fillers, pigments, dyes, antioxidants, stabilizers, ultraviolet light absorbers, mold release agents and other additives commonly employed in non-opaque polycarbonate resin formulations.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE I

One hundred parts of an aromatic polycarbonate, prepared by reacting 2,2-bis(4-hydroxyphenyl)propane and phosgene in the presence of an acid acceptor and a molecular weight regulator and having an intrinsic viscosity of 0.57 is mixed with the amounts of finely ground additives either singly or in combination as listed in Table I by tumbling the ingredients together in a laboratory tumbler. The resulting mixture is then fed an extruder, which extruder is operated at about 265° C, and the extrudate is comminuted into pellets.

The pellets are then injection molded at about 315° C into test bars of about 5 by ½ by about 1/16-⅛ in. thick into test squares of about 2 by 2 by about ½ in. thick. The test bars (five for each additive listed in the Table) are subject to the test procedure set forth in Underwriters' Laboratories, Inc. Bulletin UL-94, Burning Test for Classifying Materials. In accordance with this test procedure, materials so investigated are rated either V-0, V-I or V-II based on the results of five specimens. The criteria for each V (for vertical) rating per UL-94 is briefly as follows:

"V-0": Average flaming and/or glowing after removal of the igniting flame shall not exceed 5 seconds and none of the specimens shall drip flaming particles which ignite absorbent cotton.

"V-I": Average flaming and/or glowing after removal of the igniting flame shall not exceed 25 seconds and the glowing does not travel vertically for more than ⅛ inch of the specimen after flaming ceases and glowing is incapable of igniting absorbent cotton.

"V-II": Average flame and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the instant invention, as "burns". Further, UL-94 requires that all test bars in each test group must meet the V type rating to achieve the particular classification. Otherwise, the five bars receive the rating of the worst single bar. For exampel, if one bar is classified as V-II and the other four (4) are classified as V-0, then the rating for all 5 bars is V-II.

The test squares are tested for light transmission in a Gardner XL 10-COM instrument. The data shows the amount of incident light transmitted by the test squares using air as 100% transmission.

The results of the light transmission test on different additives within the scope of the instant invention are set forth as follows in Table I with a control being the aromatic polycarbonate as prepared above without the additives of the type set The results of the Bulletin UL-94 test on different additives with the scope of the instant invention are set forth in Table II with the same control being used as in Table I.

TABLE I

Improvement in Optical Properties of Polycarbonates by Replacing Alkali or Alkaline Earth Metal Ions with Organic Cations as Additives Employed at 1.0 Parts Per Hundred Level

| Sample | Anion | Cation | Light Transmission (%) |
|---|---|---|---|
| Control | — | — | 86–88 |

TABLE I -continued
Improvement in Optical Properties of Polycarbonates by Replacing Alkali or Alkaline Earth Metal Ions with Organic Cations as Additives Employed at 1.0 Parts Per Hundred Level

| Sample | Anion | Cation | Light Transmission (%) |
|---|---|---|---|
| A. | benzene-$SO_3^-$ | $Na^+$ | 41.1 |
| B. | 2 benzene-$SO_3^-$ | $Ca^{++}$ | 53.3 |
| C. | benzene-$SO_3^-$ | phenyl-$N^+(CH_3)_3$ | 74.4 |
| D. | 2,4,5-trichlorobenzene-$SO_3^-$ | $Na^+$ | 18.9 |
| E. | 2 (2,4,5-trichlorobenzene-$SO_3^-$) | $Ca^{++}$ | 54.6 |
| F. | 2,4,5-trichlorobenzene-$SO_3^-$ | $(CH_3)_4N^+$ | 88.0 |
| G. | 2,4,5-trichlorobenzene-$SO_3^-$ | $(\text{phenyl})_4 P^+$ | 76.0 |
| H. | 2,4,5-trichlorobenzene-$SO_3^-$ | $(\text{phenyl})_3 S^+$ | 69.0 |
| I. | 2,4,5-trichlorobenzene-$SO_3^-$ | $(C_4H_9)_4 N^+$ | 88.4 |
| J. | 2 (2,4,5-trichlorobenzene-$SO_3^-$) | $(\text{phenyl})_3 P^+-CH_2-\text{phenyl}-CH_2-P^+(\text{phenyl})_3$ | 84.6 |

TABLE II

| Sample | ADDITIVE Anion | ADDITIVE Cation | Amount of Additive (Parts Per Hundred) | Flame Out Time Seconds | No. of Drips Per Five Test Bars | UL-94 Rating |
|---|---|---|---|---|---|---|
| CONTROL A' | — | — | — | 26 | 13 | Burning |
| B' | phenyl-$SO_3^-$ | phenyl-$N^+(CH_3)_3$ | 1.0 | 4.8 | 7 | V-II |
| | 2,4,5-trichlorophenyl-$SO_3^-$ | $(CH_3)_4$–$N^+$ | 0.5 | 7.3 | 0 | V-I |
| C' | " | $(phenyl)_3$–$S^+$ | 1.0 | 4.8 | 0 | V-0 |
| D' | " | $(phenyl)_2$–$I^+$ | 1.0 | 3.9 | 6 | V-II |
| E' | " | $(phenyl)_4$–$P^+$ | 1.0 | 6.9 | 0 | V-I |
| F' | $Cl^-$ | $(phenyl)_2$–$I^+$ | 1.0 | 7.2 | 4 | V-II |
| G' | $Cl^-$ | phenyl-C(N=N-phenyl)(N=N-phenyl)$^+$ | 1.0 | 4.8 | 3 | V-II |
| H' | 2,4,5-trichlorophenyl-$SO_3^-$ | $CH_3$–$N^+$(pyridine)-$SO_3^-Na^+$ | 0.85 | 2.2 | 0 | V-0 |
| I' | 2,3,5,6-tetrachlorophenyl-$SO_3^-$ (×2) | $(phenyl)_3P^+$–$CH_2$–phenyl–$CH_2$–$P^+(phenyl)_3$ | 0.85 | 2.2 | 0 | V-0 |
| J' | phenyl-$SO_3^-$ | $[(CH_3)_2N$–C(NH-phenyl)–$N(CH_3)_2]^+$ | 0.10 | 7.6 | 9 | V-II |

It will thus be seen that the objects set forth above among those made apparent from the preceding description are efficiently attained and since certain hanges may be made in carrying out the above process and in the composition set forth without departing from the scope of this invention, it is intended that all matters contained in the above description shall be interpreted as illustrative and not in a limiting sense.

What is claimed is:

1. A non-opaque flame retardant polycarbonate composition comprising in admixture an aromatic carbonate polymer and a minor amount of an additive selected from the group consisting of the organic cationic salts of unsubstituted and substituted monomeric or polymeric aliphatic, aromatic or heterocyclic sulfonic acids and mixtures thereof and inorganic acids, the cationic porion of said organic cationic salt being selected from substituted or unsubstituted carbonium, sulfonium, ammonium, phosphonium, arsonium, and iodonium cations.

2. The composition of claim 1 wherin the anionic portion of the organic cationic salt is an inorganic anion selected from the group consisting of chloride, bromide, iodide, sulfate, sulfite, carbonate, nitrate, phosphate and borate.

3. The composition of claim 1 wherein the anionic portion of the organic cationic salt is selected from the following anions:
 monomeric or polymeric aromatic sulfonates;
 monomeric or polymeric substituted aromatic sulfonates;
 monomeric or polymeric aromatic sulfonesulfonates;

aromatic ketone sulfonates;

heterocyclic sulfonates;

halogenated methanesulfonates;

perfluoroalkane sulfonates;

aromtic sulfide sulfonates;

monomeric or polymeric aromatic ether sulfonates;

aliphatic and olefinic sulfonates;

monomeric or polymeric phenol ester sulfonates;

halocycloaliphatic aromatic sulfonates;

monomeric or polymeric aromatic amide sulfonates.

4. The composition of claim 1 wherein the additive is prsent in an amount of from 0.001 to about 10.0 parts per hundred parts of the aromatic carbonate polymer.

5. The composition of claim 1 wherein the additive is:

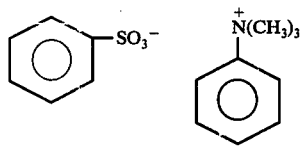

6. The composition of claim 1 wherein the additive is:

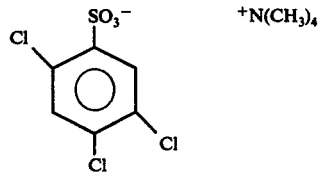

7. The composition of claim 1 wherein the additive is:

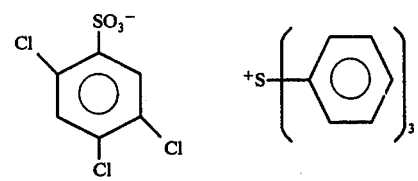

8. The composition of claim 1 wherein the additive is:

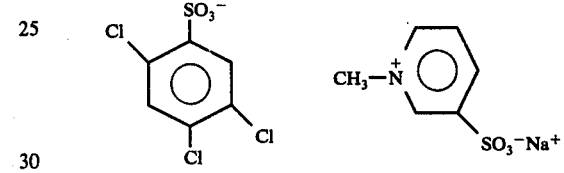

9. The composition of claim 1 wherein the organic cationic salt is admixed with an alkali or alkaline earth metal salt of unsubstituted or substituted monomeric or polymeric aliphatic, aromatic or heterocyclic sulfonic acids.

* * * * *

UNITED STATES PATENT AND TRADEMARK OFFICE
CERTIFICATE OF CORRECTION

PATENT NO. : 4,093,589

DATED : June 6, 1978

INVENTOR(S) : Arnold Factor, Donald Benjamin George Jaquiss and Victor Mark

It is certified that error appears in the above-identified patent and that said Letters Patent are hereby corrected as shown below:

Col. 1, line 61, "ans" should be -- and --

Col. 3, line 22, "sulfer" should be -- sulfur --

Col. 4, line 21, "titled" is misspelled

, line 62, "alkali" is misspelled

Col. 5, line 8, "and" should be deleted and -- an -- inserted in its place.

, line 27, "meta" should be --metal --

, line 35, delete "halo-, nitro-, trihalomethyl- and" and insert in its place -- sulfonic acids --

, line 41, "halonitro-," should be -- halo-, nitro-, --

Col. 6, line 3, "homopolymers" is misspelled

, "admixtures" should be deleted and -- and mixtures -- inserted in its place

UNITED STATES PATENT AND TRADEMARK OFFICE
CERTIFICATE OF CORRECTION

PATENT NO. : 4,093,589

DATED : June 6, 1978

INVENTOR(S) : Arnold Factor, Donald Benjamin George Jaquiss and Victor Mark

It is certified that error appears in the above-identified patent and that said Letters Patent are hereby corrected as shown below:

(Continued)

Col. 6, line 4, after "with" insert -- a --

, line 19, "carbonate" is misspelled

, line 28, "halides" is misspelled.

, line 33, "di-(trichlorophenyl)carbonate" is misspelled.

Col. 7, line 14, "and" is misspelled.

, line 34, "e" should be -- be --

Col. 8, line 45, "exampel" should be -- example --

UNITED STATES PATENT AND TRADEMARK OFFICE
CERTIFICATE OF CORRECTION

PATENT NO. : 4,093,589  
DATED : June 6, 1978  
INVENTOR(S) : Arnold Factor, Donald Benjamin George Jaquiss and Victor Mark Page 3 of 3

It is certified that error appears in the above-identified patent and that said Letters Patent are hereby corrected as shown below:

(Continued)

Col. 8, line 49, "10-COM" should be -- 10-CDM --

, line 56, after "set" insert -- forth herein. --

Col. 11, line 55, "hanges" should be -- changes --

Claim 1, line 8, "porion" should be -- portion --

Claim 3, line 12, "aromtic" should be -- aromatic --

Signed and Sealed this

Nineteenth Day of December 1978

[SEAL]

Attest:

RUTH C. MASON  
Attesting Officer

DONALD W. BANNER  
Commissioner of Patents and Trademarks